Dec. 11, 1923.
B. H. DOSENBACH
PROCESS OF CONCENTRATING ORES
Filed Dec. 7, 1915
1,477,476
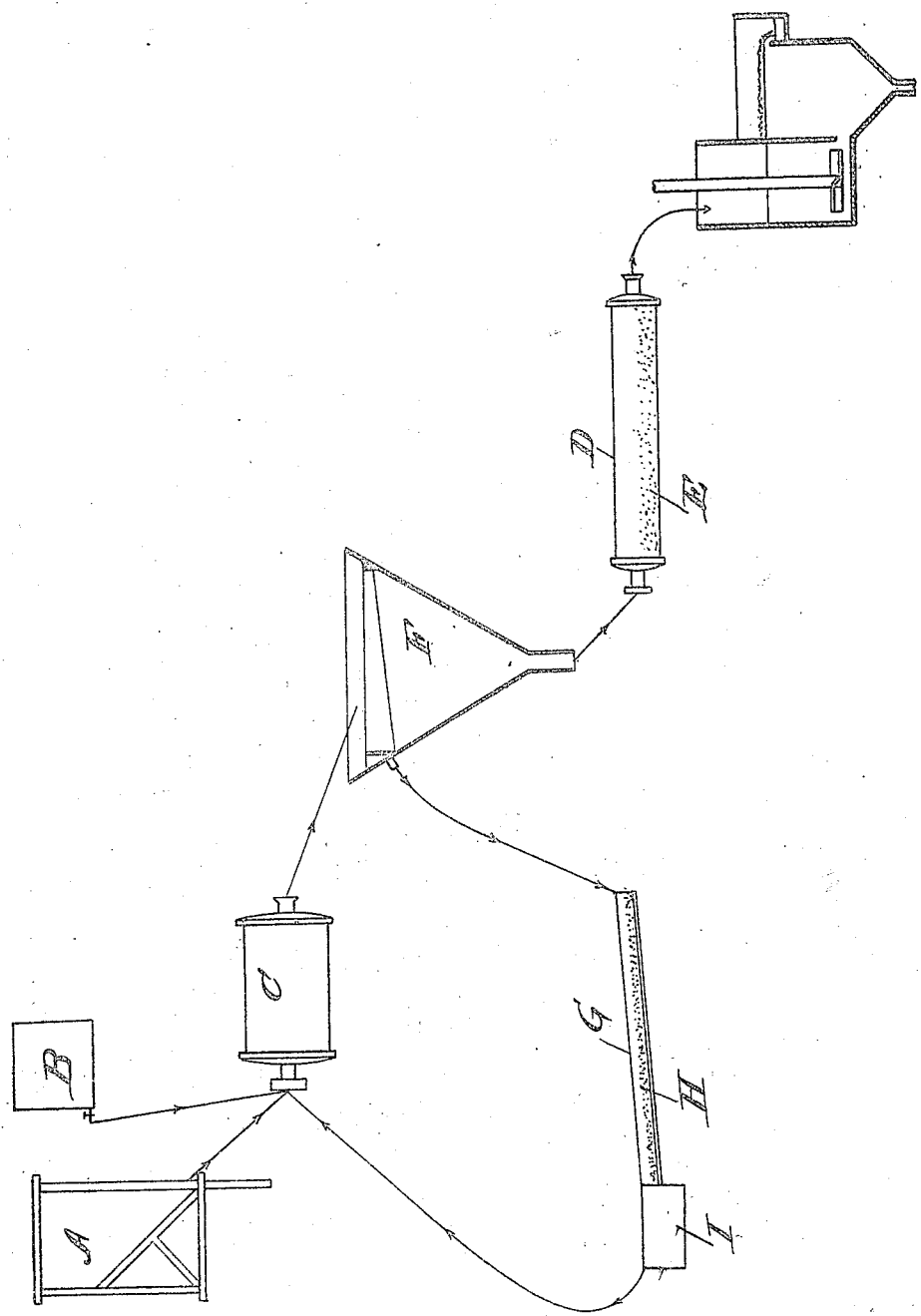

Patented Dec. 11, 1923.

1,477,476

UNITED STATES PATENT OFFICE.

BENJAMIN H. DOSENBACH, OF BUTTE, MONTANA; EDNA M. DOSENBACH EXECUTRIX OF SAID BENJAMIN H. DOSENBACH, DECEASED.

PROCESS OF CONCENTRATING ORES.

Application filed December 7, 1915. Serial No. 65,485.

*To all whom it may concern:*

Be it known that I, BENJAMIN H. DOSENBACH, a citizen of the United States, residing at Butte, in the county of Silver Bow and State of Montana, have invented certain new and useful Improvements in Processes of Concentrating Ores, of which the following is a specification.

My invention consists in means for concentrating ores by a combination of the leaching and flotation methods.

In some instances copper ores contain sulphide copper, together with the various oxides, carbonates, silicates, etc. of copper. My process is adapted to the treatment of ores of this class. The sulphide copper in such ores remains practically unaltered during the leaching operation by which the oxides, carbonates and silicates of copper are dissolved, and after the dissolved copper is precipitated the application of the flotation step results in floating the sulphide copper, together with the precipitated metallic copper.

Briefly stated, my process consists, first, in grinding the ore as finely as may be necessary to effect the most rapid and complete solution of the copper oxide, carbonate and silicate, the existence of slimes in the ore pulp being no disadvantage in the application of the subsequent step of the process. After the sulphuric acid, which is added to the pulp, has dissolved the copper, I precipitate the copper, in metallic form, preferably by the use of iron scrap. Up to this point no separation of the metallic copper or sulphide from the remainder of the ore in the pulp has been effected. The copper has simply been dissolved, forming the sulphate, and then precipitated as metal, the process up to this point consisting simply in transforming the copper oxides, carbonates, silicates, etc. into metallic copper. Having effected this conversion of the copper into free metal, I have found that the metallic copper and the sulphides can be simultaneously separated by the ordinary flotation methods. At this point, therefore, I introduce air into the pulp, either by agitation or by passing the air through some porous medium, whereupon the metallic copper floats as a froth and is floated from the surface of the pulp in the methods ordinarily used in flotation operations. While the air introduced into the pulp by agitation, or by other means, is the principal instrumentality for separating and floating the copper, it may be that gases, such as hydrogen, carbon dioxide, and hydrocarbons are formed. The generation of hydrocarbon gases I have found to be quite noticeable, resulting probably from more or less complicated actions taking place between the sulphuric acid, the iron, the carbon and sulphur contained in the iron, the copper minerals contained in the ore, and inter-actions between the various products formed. Whatever the precise chemical reactions may be the generation of such hydrocarbon gases is frequently very noticeable.

It will be obvious that many varieties of mechanism may be employed in the application of my process. As an example of a suitable arrangement of apparatus, I have illustrated in the drawing forming part of this application an arrangement similar to that used by me. The drawing is diagrammatic, taking in the form of what is generally termed a flow sheet. Detailed illustration and explanation of the apparatus used is unnecessary for the reason that all of the apparatus is of a type old and well known in the art.

Referring to the drawing:

The ore suitably crushed, say to a maximum size of about one-fourth of an inch, is supplied to the apparatus from a bin A. The sulphuric acid used for leaching may be supplied from a tank B. The ore and sulphuric acid, together with sufficient water to make a pulp, of proper consistency, are conducted to a tube mill C, where the ore is simultaneously subjected to as fine grinding as necessary, and to the solvent action of the sulphuric acid. Ordinarily the copper oxides, carbonates, and silicates will enter completely into solution in the pulp while in the tube mill referred to, but, of course, if a longer interval of time is necessary to effect the solution of the copper than is necessary for the grinding of the ore, the acid may be given further time for acting, by conducting the pulp from the tube mill to some suitable vessel for that purpose. Ordinarily, however, after the ore has been ground in the tube mill in the presence of the added sulphuric acid, the copper will be completely dissolved and the pulp may then be conducted to a horizontal rotating cylinder D, which contains scrap iron, as indicated at E. I have shown an alternative method of treatment in which the pulp, instead of being conducted directly from the tube mill C, to the rotating cylinder D, is first conducted to a Dorr tank, or other settling device, for subsequent treatment. At present, however, I will describe the method of operation utilized when the pulp is conducted directly from the tube mill C to the rotating cylinder D. In this case the rotation of the cylinder D causes efficient contact between the scrap iron therein contained and the pulp which passes through the cylinder D from left to right, as shown in the drawing. The rotation of the cylinder D further has the effect of freeing the surface of the scrap iron from the precipitated copper, and by suitably timing the flow of pulp through the cylinder D, all of the dissolved copper may be precipitated therein. The precipitated copper, however, is not retained in the cylinder D, but, being precipitated in the pulp, is carried with the pulp and the product discharged from the cylinder D comprises everything that was originally in the ore, no separation having been effected up to this point. The material discharged from the cylinder D, however, carries the copper in the form of precipitated or cement copper and sulphide, as distinguished from the carbonates, silicates, and oxides, in which the copper originally existed. The object of the operation so far described is simply to effect the conversion of the copper carbonates, silicates and oxides into the metallic form.

The pulp discharged from the rotating cylinder D contains the copper in the metallic form and in the form of sulphide, and in these forms it is amenable to flotation treatment, which may be effected in any of the well known forms of apparatus, such, for instance, as that illustrated in Patent No. 1,022,085, granted to James M. Hyde, April 2, 1912. As above stated, the flotation may be effected in apparatus in which the air is introduced into the pulp under sufficient pressure through a porous wall or by means of jets. Such means of effecting flotation are illustrated in Patent No. 793,808, granted to H. L. Sulman and H. F. Kirkpatrick-Picard, July 4, 1905, and Patent No. 1,104,735, granted to J. M. Callow July 21, 1914. The flotation operation, however conducted, and whatever apparatus used, results in the flotation of the cement copper, together with the sulphide copper contained in the ore, in the form of a froth, which may be floated off from the remainder of the pulp and separated in the way ordinarily practiced in flotation operations. As above stated, I have in some instances found the addition of a frothing agent, such as an oil, or other of the substances hereinbefore enumerated, unnecessary, but my process is not restricted to the use, or non-use, or the use of any particular floating agent, and includes the operation regardless of whether the flotation be effected by the addition of frothing agents, or by the properties imparted to the pulp by the various salts formed in the leaching operation.

What I claim is:—

1. A process of concentrating ores comprising the operations of reducing the ore to a wet pulp, adding acid thereto to dissolve the metal, settling the pulp containing the dissolved metal, overflowing the clear liquor, precipitating the metal from the clear liquor, then precipitating the dissolved metal in the thickened pulp, and separating the precipitated metal from the remainder of the thickened pulp by flotation.

2. A process of concentrating ores comprising the operations of reducing the ore to a wet pulp, adding acid thereto to dissolve the metal, settling the pulp containing the dissolved metal, overflowing the clear liquor, precipitating the metal from the clear liquor, adding the clear liquor from which the metal has been so separated to the leaching solution, then precipitating the dissolved metal in the thickened pulp, and separating the precipitated metal from the remainder of the thickened pulp by flotation.

In testimony whereof, I have subscribed my name.

BENJAMIN H. DOSENBACH.